(12) United States Patent
Fredette et al.

(10) Patent No.: US 11,288,113 B1
(45) Date of Patent: Mar. 29, 2022

(54) SYSTEM AND METHOD FOR COMMUNICATING MESSAGES WITH A SIDEBAND COMMUNICATION CHANNEL

(71) Applicant: EMC IP Holding Company, LLC, Hopkinton, MA (US)

(72) Inventors: Gerry Fredette, Bellingham, MA (US); Mike Xizhan Song, Westborough, MA (US); Xu Jinqing, ShangHai (CN); Peter J. McCann, Mason, NH (US)

(73) Assignee: EMC IP HOLDING COMPANY, LLC, Hopkinton, MA (US)

( * ) Notice: Subject to any disclaimer, the term of this patent is extended or adjusted under 35 U.S.C. 154(b) by 0 days.

(21) Appl. No.: 17/073,516

(22) Filed: Oct. 19, 2020

(51) Int. Cl.
*G06F 11/00* (2006.01)
*G06F 11/07* (2006.01)

(52) U.S. Cl.
CPC ...... *G06F 11/0784* (2013.01); *G06F 11/0721* (2013.01)

(58) Field of Classification Search
CPC .. G06F 11/0784; G06F 11/0721; G06F 11/07; G06F 11/0703; G06F 11/0766
See application file for complete search history.

(56) References Cited

U.S. PATENT DOCUMENTS

| 10,942,800 B2 * | 3/2021 | Yun ............ G06F 11/0778 |
| 2013/0080567 A1 * | 3/2013 | Pope ............ G06Q 40/04 709/213 |
| 2014/0156871 A1 * | 6/2014 | Chandrasekaran ... G06F 13/102 710/5 |

* cited by examiner

*Primary Examiner* — Katherine Lin
(74) *Attorney, Agent, or Firm* — Brian J. Colandreo; Mark H. Whittenberger; Holland & Knight LLP

(57) ABSTRACT

A method, computer program product, and computing system for generating a sideband communication channel between a storage kernel driver and an error handling module of a storage system. One or more messages on the storage kernel driver may be detected. At least one message of the one or more messages may be communicated, via the sideband communication channel, from the storage kernel driver to the error handling module.

15 Claims, 6 Drawing Sheets

SYSTEM AND METHOD FOR COMMUNICATING MESSAGES WITH A SIDEBAND COMMUNICATION CHANNEL

BACKGROUND

Storing and safeguarding electronic content may be beneficial in modern business and elsewhere. Accordingly, various methodologies may be employed to protect and distribute such electronic content.

Modern storage systems include various software components and modules to monitor the operation of other components or devices within a storage system. When a component or device experiences any issue, a message may be generated for processing by another component or module. Conventional approaches for conveying these messages to other components, especially from a kernel layer to a user space layer in a software IO stack, require pre-allocation of memory of each input/output (TO) packet and potentially wasted CPU cycles to determine whether or not the allocated portion of each IO packet includes a message for another module in the storage system.

SUMMARY OF DISCLOSURE

In one example implementation, a computer-implemented method executed on a computing device may include, but is not limited to, generating a sideband communication channel between a storage kernel driver and an error handling module of a storage system. One or more messages on the storage kernel driver may be detected. At least one message of the one or more messages may be communicated, via the sideband communication channel, from the storage kernel driver to the error handling module.

One or more of the following example features may be included. Generating the sideband communication channel between the storage kernel driver and the error handling module of the storage system may include sending, via the sideband communication channel, a poll request from the error handling module to the storage kernel driver. Detecting the one or more messages of the storage kernel driver may include receiving, at the storage kernel driver, the one or more messages from one or more storage devices of the storage system. In response to receiving, at the storage kernel driver, the one or more messages from one or more storage devices of the storage system, the poll request may be returned, via the sideband communication channel, to the error handling module. The one or more messages received from the one or more storage devices may be stored in a buffer of the storage kernel driver. Communicating, via the sideband communication channel, the at least one message of the one or more messages from the storage kernel driver to the error handling module may include sending, via the sideband communication channel, one or more input/output control requests from the error handling module to the storage kernel driver. Each input/output control request may be configured to retrieve a predefined number of messages from the storage kernel driver.

In another example implementation, a computer program product resides on a computer readable medium that has a plurality of instructions stored on it. When executed by a processor, the instructions cause the processor to perform operations that may include, but are not limited to, generating a sideband communication channel between a storage kernel driver and an error handling module of a storage system. One or more messages on the storage kernel driver may be detected. At least one message of the one or more messages may be communicated, via the sideband communication channel, from the storage kernel driver to the error handling module.

One or more of the following example features may be included. Generating the sideband communication channel between the storage kernel driver and the error handling module of the storage system may include sending, via the sideband communication channel, a poll request from the error handling module to the storage kernel driver. Detecting the one or more messages of the storage kernel driver may include receiving, at the storage kernel driver, the one or more messages from one or more storage devices of the storage system. In response to receiving, at the storage kernel driver, the one or more messages from one or more storage devices of the storage system, the poll request may be returned, via the sideband communication channel, to the error handling module. The one or more messages received from the one or more storage devices may be stored in a buffer of the storage kernel driver. Communicating, via the sideband communication channel, the at least one message of the one or more messages from the storage kernel driver to the error handling module may include sending, via the sideband communication channel, one or more input/output control requests from the error handling module to the storage kernel driver. Each input/output control request may be configured to retrieve a predefined number of messages from the storage kernel driver.

In another example implementation, a computing system includes at least one processor and at least one memory architecture coupled with the at least one processor, wherein the at least one processor is configured to generate a sideband communication channel between a storage kernel driver and an error handling module of a storage system. The at least one processor may be further configured to detect one or more messages on the storage kernel driver. The at least one processor may be further configured to communicate, via the sideband communication channel, at least one message of the one or more messages from the storage kernel driver to the error handling module.

One or more of the following example features may be included. Generating the sideband communication channel between the storage kernel driver and the error handling module of the storage system may include sending, via the sideband communication channel, a poll request from the error handling module to the storage kernel driver. Detecting the one or more messages of the storage kernel driver may include receiving, at the storage kernel driver, the one or more messages from one or more storage devices of the storage system. In response to receiving, at the storage kernel driver, the one or more messages from one or more storage devices of the storage system, the poll request may be returned, via the sideband communication channel, to the error handling module. The one or more messages received from the one or more storage devices may be stored in a buffer of the storage kernel driver. Communicating, via the sideband communication channel, the at least one message of the one or more messages from the storage kernel driver to the error handling module may include sending, via the sideband communication channel, one or more input/output control requests from the error handling module to the storage kernel driver. Each input/output control request may be configured to retrieve a predefined number of messages from the storage kernel driver.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

System Overview

Figure 1:
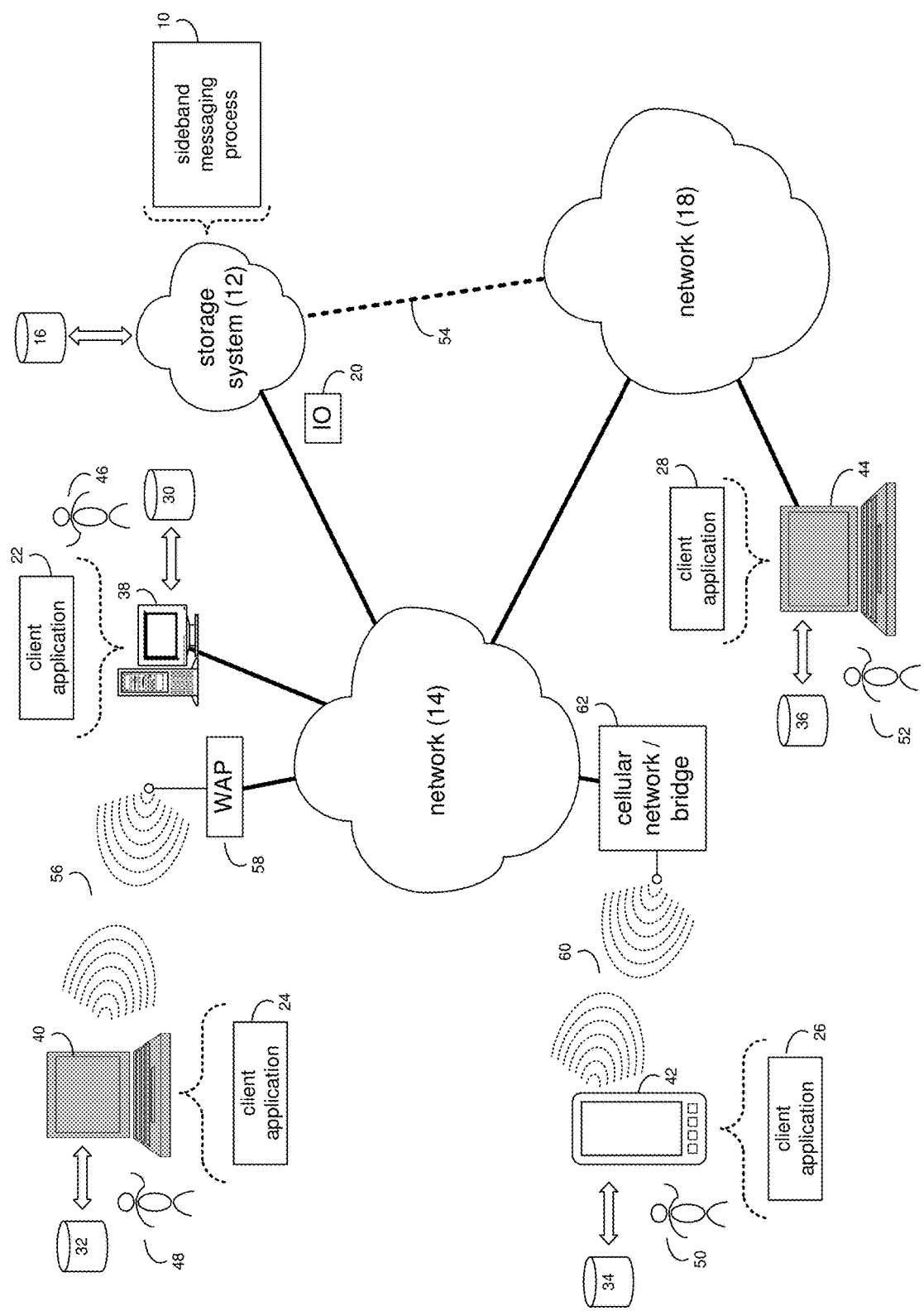
FIG. 1 is an example diagrammatic view of a storage system and a sideband messaging process coupled to a distributed computing network according to one or more example implementations of the disclosure.

Referring to FIG. 1, there is shown sideband messaging process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of sideband messaging process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of sideband messaging process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RANI); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a sideband messaging process, such as sideband messaging process 10 of FIG. 1, may include but is not limited to, generating a sideband communication channel between a storage kernel driver and an error handling module of a storage system. One or more messages on the storage kernel driver may be detected. At least one message of the one or more messages may be communicated, via the sideband communication channel, from the storage kernel driver to the error handling module.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
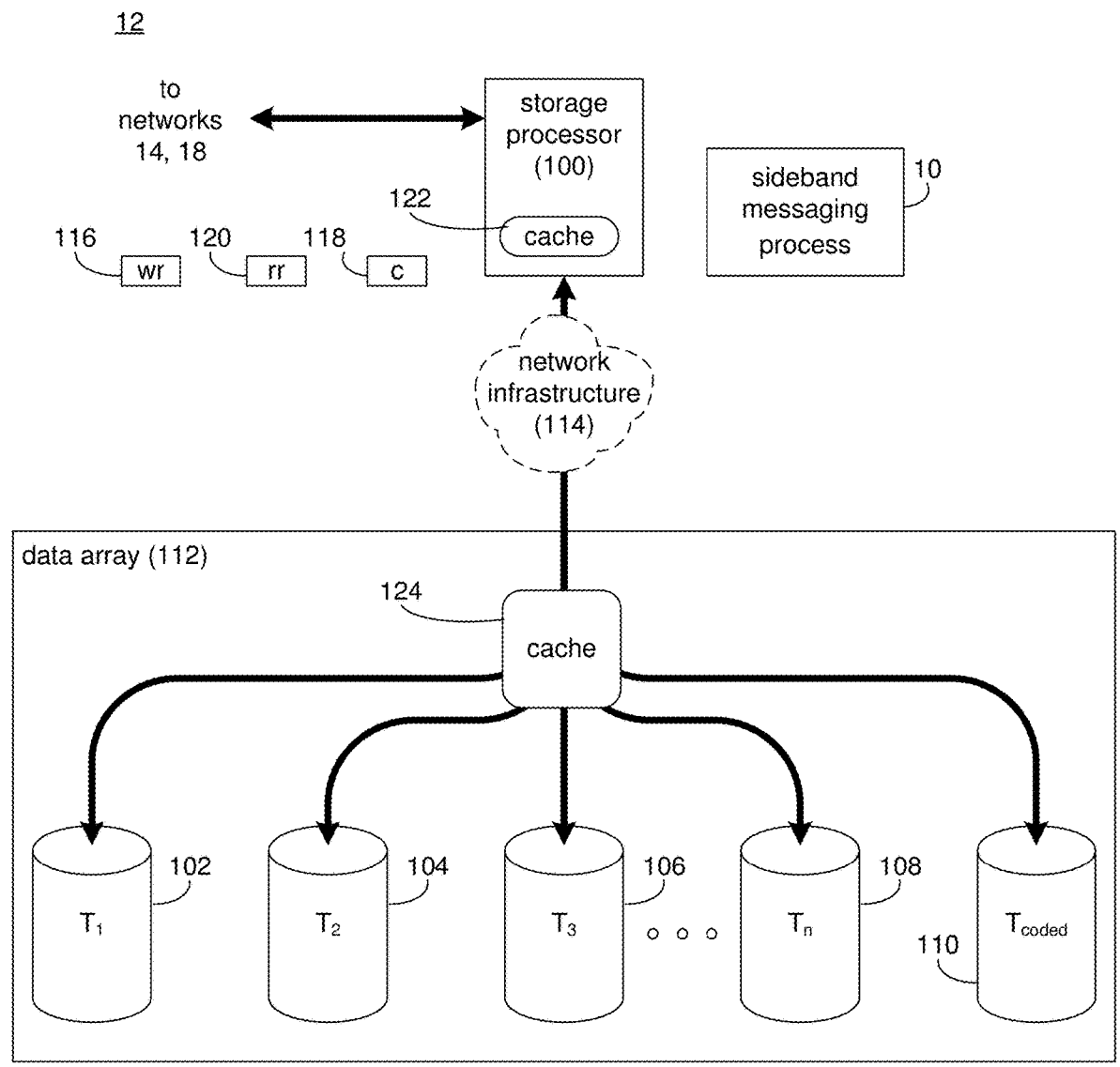
FIG. 2 is an example diagrammatic view of the storage system of FIG. 1 according to one or more example implementations of the disclosure.
Figure 3:
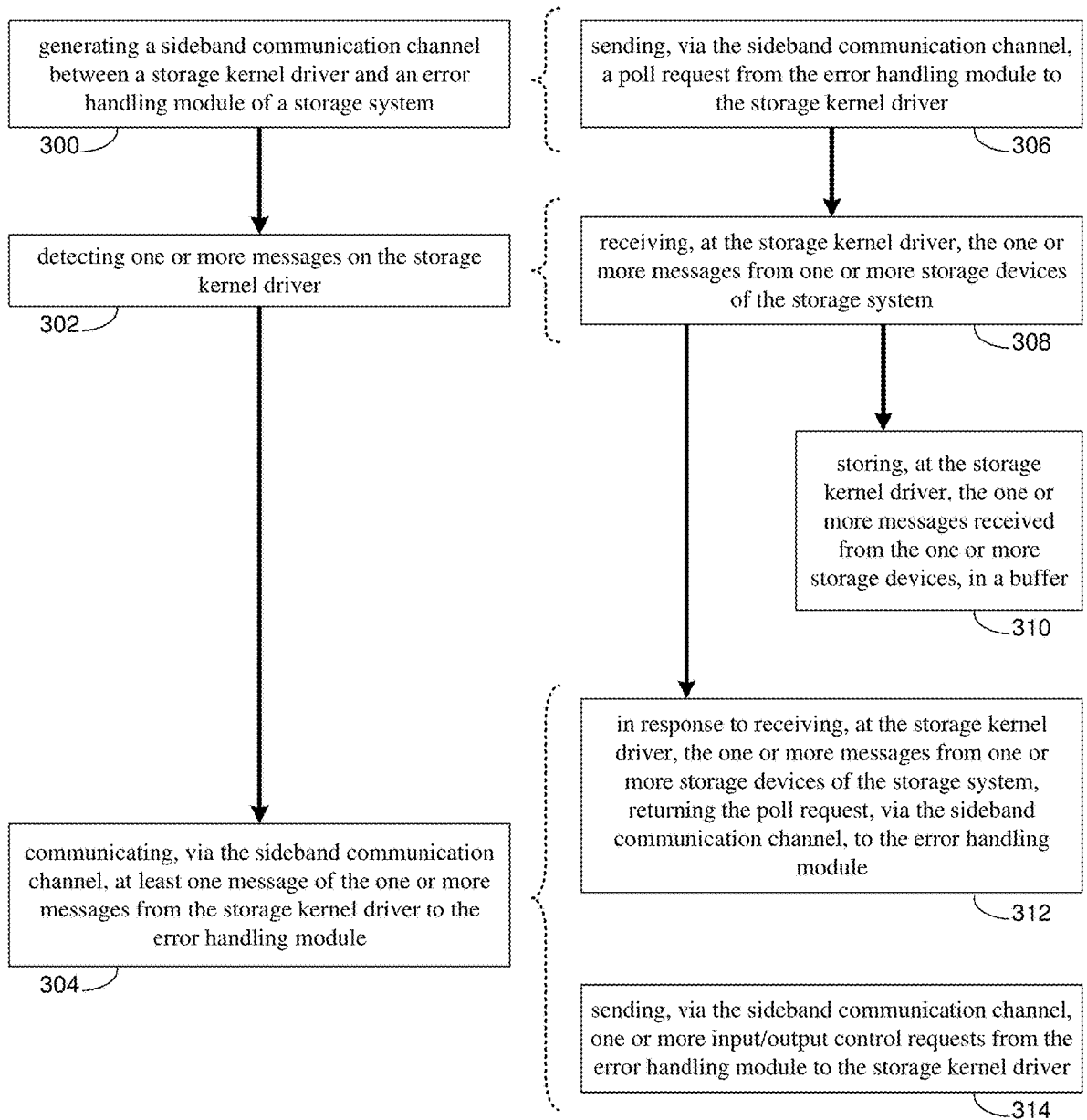
FIG. 3 is an example flowchart of sideband messaging process according to one or more example implementations of the disclosure.

The Storage System:

Referring also to FIG. 2, storage system 12 may include one or more storage processors (e.g., storage processor 100) and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of sideband messaging process 10. The instruction sets and subroutines of sideband messaging process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of sideband messaging process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system), a non-volatile, solid-state, cache memory system (e.g., a flash-based, cache memory system), an L1 cache, and/or an L2 cache.

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of sideband messaging process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of sideband messaging process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

The Sideband Messaging Process:

Referring also to the examples of FIGS. 3-6 and in some implementations, sideband messaging process 10 may generate 300 a sideband communication channel between a storage kernel driver and an error handling module of a storage system. One or more messages on the storage kernel driver may be detected 302. At least one message of the one or more messages may be communicated 304, via the sideband communication channel, from the storage kernel driver to the error handling module.

As will be discussed in greater detail below, implementations of the present disclosure may allow for savings in memory and CPU usage when communicating messages within a storage system. For example, storage system 12 may include various software components or modules in a software IO stack. As will be discussed in greater detail below, conventional approaches for conveying messages between the software components across various layers of the software IO stack may require significant memory and CPU usage.

In one example, a backend storage drive may be configured to generate one or more error messages and may send the one or more error messages to a storage controller managing the backend storage drive. In some implementations, a storage system may include an error handling module in upper layers of a software IO stack that is configured to process the one or more error messages from the backend storage drive and perform one or more error handling operations. However, conventional approaches for conveying or communicating these error messages between the storage controller and the error handling module across various layers of the software IO stack generally require significant memory and CPU resources.

Figure 4:
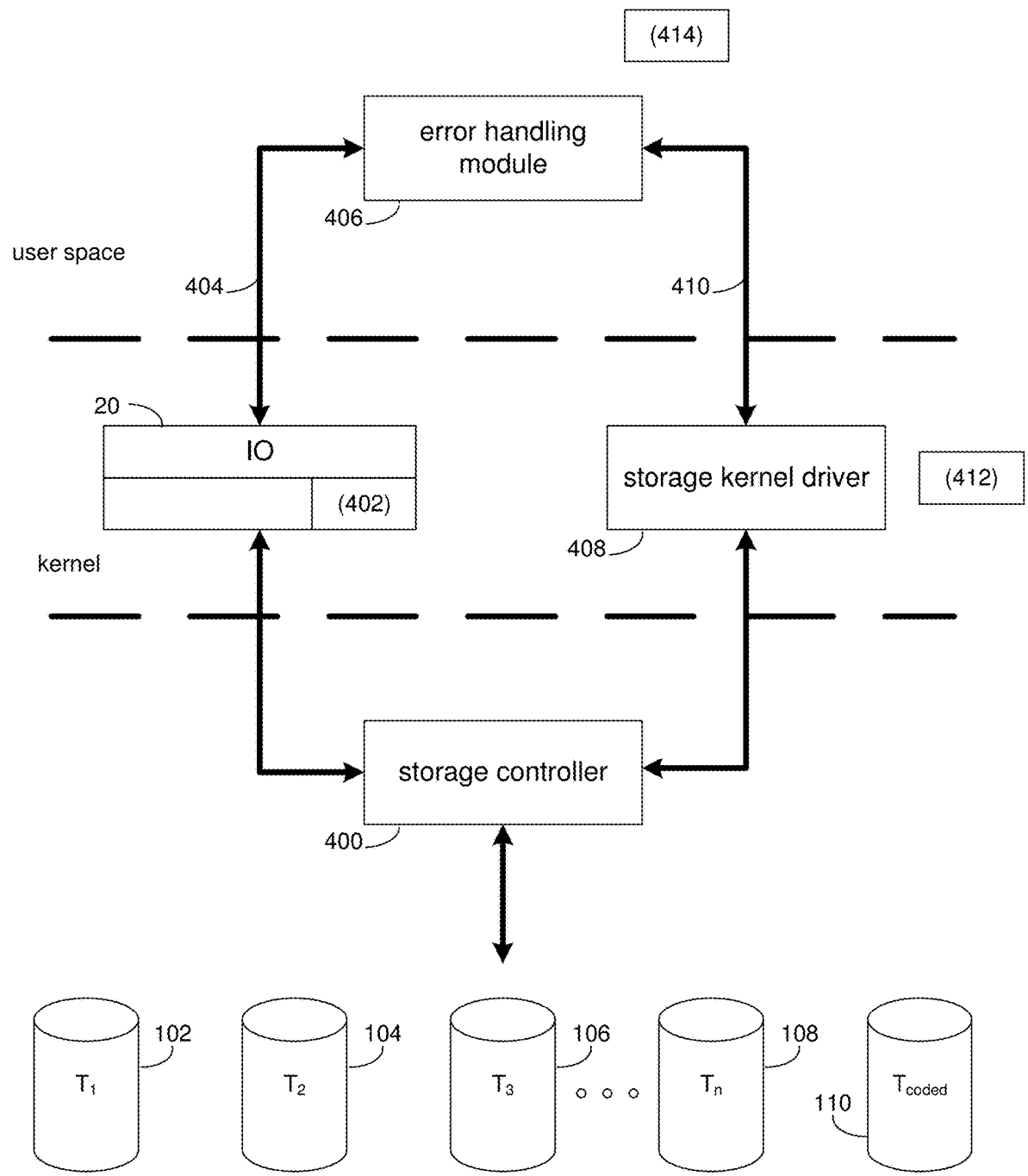
FIG. 4 is an example diagrammatic view of the storage system of FIG. 1 according to one or more example implementations of the disclosure.

Referring also to the example of FIG. 4 and in some implementations, storage system 12 may include a software IO stack with various layers with various software components and/or modules. For example, a lowest level of the software stack IO may include a plurality of storage devices (e.g., storage targets 102, 104, 106, 108, 110). In some implementations, the plurality of storage devices (e.g., storage targets 102, 104, 106, 108, 110) may be communicatively coupled to a storage controller (e.g., storage controller 400). As discussed above and in some implementations, the plurality of storage devices (e.g., storage targets 102, 104, 106, 108, 110) may generate one or more error messages in response to an error associated with a storage device. As shown in the example of FIG. 4, storage controller 400 may process one or more IO packets (e.g., IO 20) received from one or more hosts coupled to storage processor 100. Conventional approaches to communicating the one or more error messages within the storage system may include reserving a portion of each IO packet (e.g., portion 402 of IO 20).

For example, suppose a storage system sends an IO packet (e.g., IO 20), with data to be written to storage target 102, down the software IO stack via an IO channel (e.g., IO channel 404). In this example, IO 20 may include a reserved portion (e.g., portion 402) for communicating a potential error message back up the layers of the software IO stack. In one example, suppose storage target 102 experiences a failure. Storage controller 400 may receive an error message indicating the storage target 102 has failed. In this example, storage controller 400 may utilize reserved portion 402 of IO for communicating the error message to an error handling module (e.g., error handling module 406) in the software IO stack. Accordingly, portion 402 of IO 20 may be configured to include the error message indicating that storage target 102 has failed. The IO response may be conveyed up the layers of the software IO stack of storage system 12 via IO channel 404.

In some implementations and as will be discussed in greater detail below, an error message may require a very limited amount of memory (e.g., 64 bytes each). However, for memory alignment purposes, portion 402 of IO may be substantially larger than any error message (e.g., 4 kilobytes). In this example, substantial memory may be pre-allocated within each IO for a potential error message.

Returning to the above example, suppose IO 20 including the error message indicating that storage target 102 has failed, is received by the error handling module (e.g., error handling module 406) at an upper layer (e.g., a user space layer) of the software IO stack. Error handling module 406 may buffer and process portion 402 of IO 20 and may process the error message indicating that storage target 102 has failed. In some implementations, given the size of portion 402 of IO 20, significant CPU resources may be required to buffer and process portion 402 including a single error message.

In another example, suppose the plurality of storage devices (e.g., storage targets 102, 104, 106, 108, 110) are not experiencing any issues and, therefore, do not generate any error messages. In this example and when utilizing conventional approaches, IO 20 may include pre-allocated portion 402 for a potential error message. However, when IO 20 is returned up the storage IO stack (e.g., after writing data to storage target 102), CPU resources may be expended to buffer and process portion 402 of IO 20 only to determine that no error messages have been generated. Accordingly, conventional approaches may require significant memory and CPU resources to pre-allocate memory in each IO and to process each IO to determine if an error message has been generated by a storage device.

As will be discussed in greater detail below, implementations of the present disclosure may generate a sideband communication channel between a storage kernel driver and an error handling module of a storage system for communicating messages within the storage system. In this manner, implementations of sideband messaging process 10 may allow messages (e.g., non-IO messages) generated within the storage system to be more quickly communicated to software modules and may allow IO operations to be more efficient by removing pre-allocation of memory for error messages. Accordingly, sideband messaging process 10 may improve the speed and efficiency of a storage system when communicating messages within the storage system.

In some implementations, sideband messaging process 10 may generate 300 a sideband communication channel between a storage kernel driver and an error handling module of a storage system. Referring again to the example of FIG. 4 and in some implementations, sideband messaging process 10 may deploy or utilize a storage kernel driver (e.g., storage kernel driver 408) in the kernel layer of the software IO stack of the storage system (e.g., storage system 12). In some implementations, a storage kernel driver (e.g., storage kernel driver 408) may generally include a software module configured to control a host bus adaptor (HBA) which interfaces to all the back-end storage devices. In some implementations, the storage kernel driver (e.g., storage kernel driver 408) may be configured to collect and manage messages generated by storage devices and other components of the back-end (e.g., devices in the Serial Attached SCSI (SAS) topology, devices in the Non-Volatile Memory Express (NVMe) or Non-Volatile Memory Host Controller Interface Specification topology, etc.).

In some implementations and as discussed above, storage system 12 may include an error handling module (e.g., error handling module 406) in the user space layer of the software IO stack. Error handling module 406 may generally be configured to receive messages from the storage system (e.g., error messages generated by various components) and may perform operations on the storage system in response to these messages. For example and as discussed above, the one or more messages may include error messages indicating that e.g., a storage target that has failed, a component has been unplugged, etc. In some implementations, the one or more messages may be pre-defined (e.g., industry-standard messages, vendor-specific messages, proprietary messages, etc.) to indicate a particular change or set of changes in the storage system.

In some implementations, error handling module 406 may receive one or more error messages and may determine which operations to perform (e.g., one or more error handling operations). As discussed above and in some implementations, it will be appreciated that the efficacy of the error handling module is based upon, at least in part, the rate at which the error handling module is provided with messages. Accordingly, sideband messaging process 10 may improve the speed by which messages are communicated within storage system to the error handling module by utilizing a sideband communication channel between the storage kernel driver and the error handling module.

In some implementations, a sideband communication channel may generally include an auxiliary or non-primary communication path between software components of the storage system within the software IO stack. Referring again to the example of FIG. 4 and in some implementations, sideband messaging process 10 may generate 300 a sideband communication channel (e.g., sideband communication channel 410) between the storage kernel driver (e.g., storage kernel driver 408) and the error handling module (e.g., error handling module 406). As shown in FIG. 4, sideband communication channel 410 may be a separate communication path from IO channel 404.

In some implementations, storage kernel driver 400 may create a virtual end point to which error handling module 406 may send requests. In some implementations, error handling module 406 may generate 300 or establish sideband communication channel 410 with storage kernel driver 408 by opening the virtual end point created by storage kernel driver 400.

Figure 5:
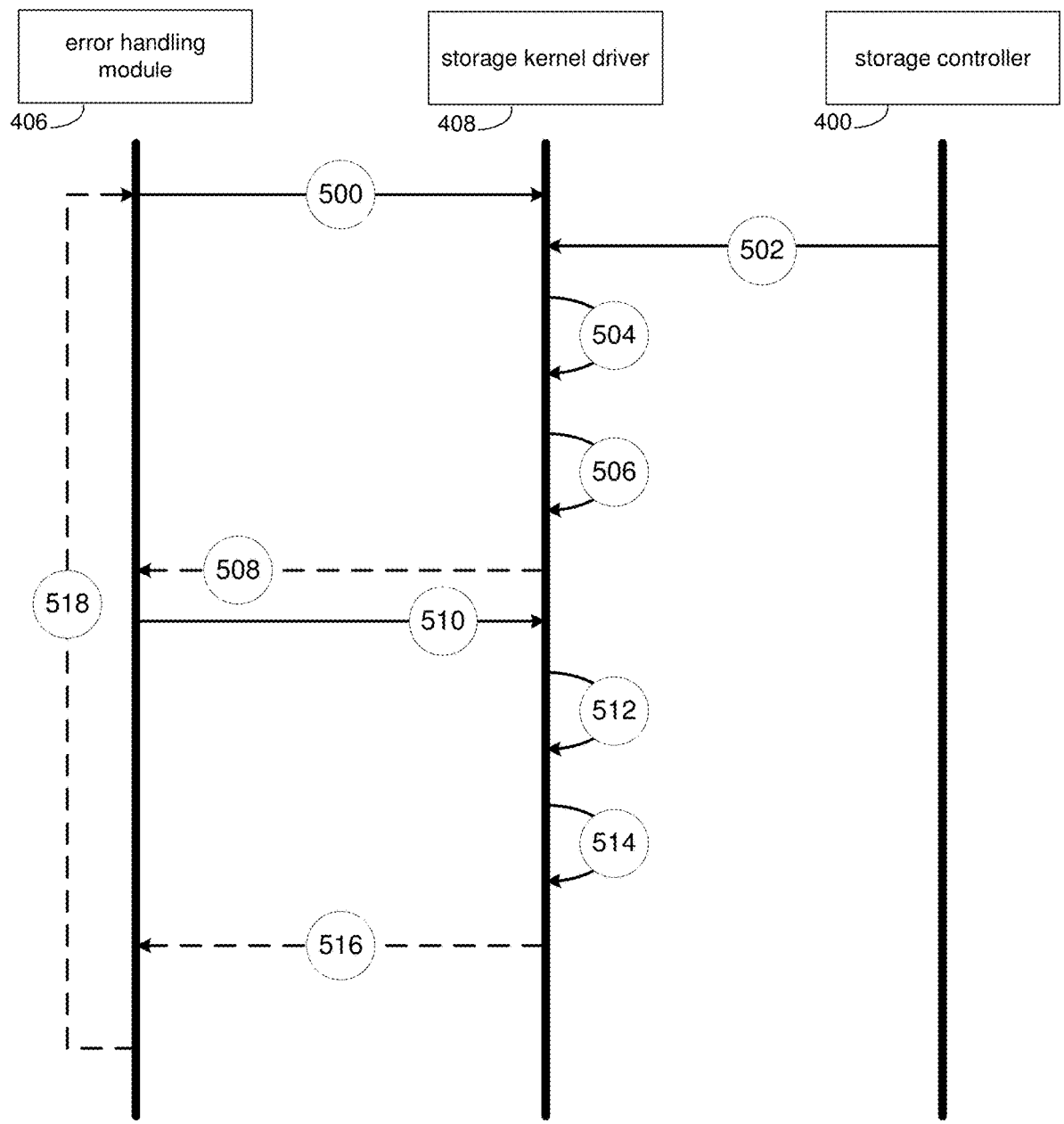
FIG. 5 is an example flowchart of sideband messaging process according to one or more example implementations of the disclosure.

In some implementations, generating 300 the sideband communication channel between a storage kernel driver and an error handling module of the storage system may include sending 306, via the sideband communication channel, a poll request from the error handling module to the storage kernel driver. Referring also to the example flowchart of FIG. 5 and in some implementations, error handling module 406 may be configured to send 306, via sideband communication channel 410, a poll request to storage kernel driver 408 (action 500 as shown in the flowchart of FIG. 5). As is known in the art, a poll request may generally include a system call to wait for one or more file descriptors to become ready for use. In this example, error handling module 406 may issue a poll request to begin a communication session with storage kernel driver 408. In some implementations, error handling module 406 may allocate one or more buffers and passes them to storage kernel driver 408. As will be discussed in greater detail below, the one or more buffers may be used to store one or more messages received by storage kernel driver 408 for communicating to error handling module 406. In some implementations, storage kernel driver 408 may, in response to receiving the poll request from error handling module 406, prepare the one or more buffers for storing the one or more messages received from one or more storage devices. In some implementations, when the one or more buffers is initialized, error handling module 406 may be configured to wait on the poll request for indication from storage kernel driver 408 that one or more messages have been received by storage kernel driver 408.

In some implementations, sideband messaging process 10 may detect 302 one or more messages on the storage kernel driver. As discussed above and in some implementations, a message may generally include a status record, an error record, a non-IO record (i.e., a record not associated with performing a host IO operation on backend storage devices), etc., generated by a storage component (e.g., a storage device, a storage controller, etc.). In some implementations, the one or more messages may include one or more error messages. For example, error messages may be generated in response to the failure or the detection of a potential issue in a storage device. In another example, error messages may be generated when components or storage devices are removed/unplugged. While examples of error messages have been provided, it will be appreciated that other, non-error messages may be generated and communicated via the sideband communication channel within the scope of the present disclosure. For example and in some implementations, the one or more messages may be pre-defined to indicate a particular change or set of changes in the storage system.

In some implementations, sideband communication channel 410 may be configured for communicating messages from storage kernel driver 408 and error handling module 406 in real time as error messages are detected 302 at storage kernel driver 408. In this manner and as will be discussed in greater detail below, error handling module 406 may be configured to detect 302 one or more messages at storage kernel driver 408 and may request these messages for processing at error module 406.

In some implementations, detecting 302 the one or more messages of the storage kernel driver may include receiving 308, at the storage kernel driver, the one or more messages from one or more storage devices of the storage system. Referring again to the example flowchart of FIG. 5, action 502 may include receiving 308, at storage kernel driver 408, one or more messages (e.g., message 412) from one or more storage devices (e.g., storage targets 102, 104, 106, 108, 110) of storage system 12.

Figure 6:
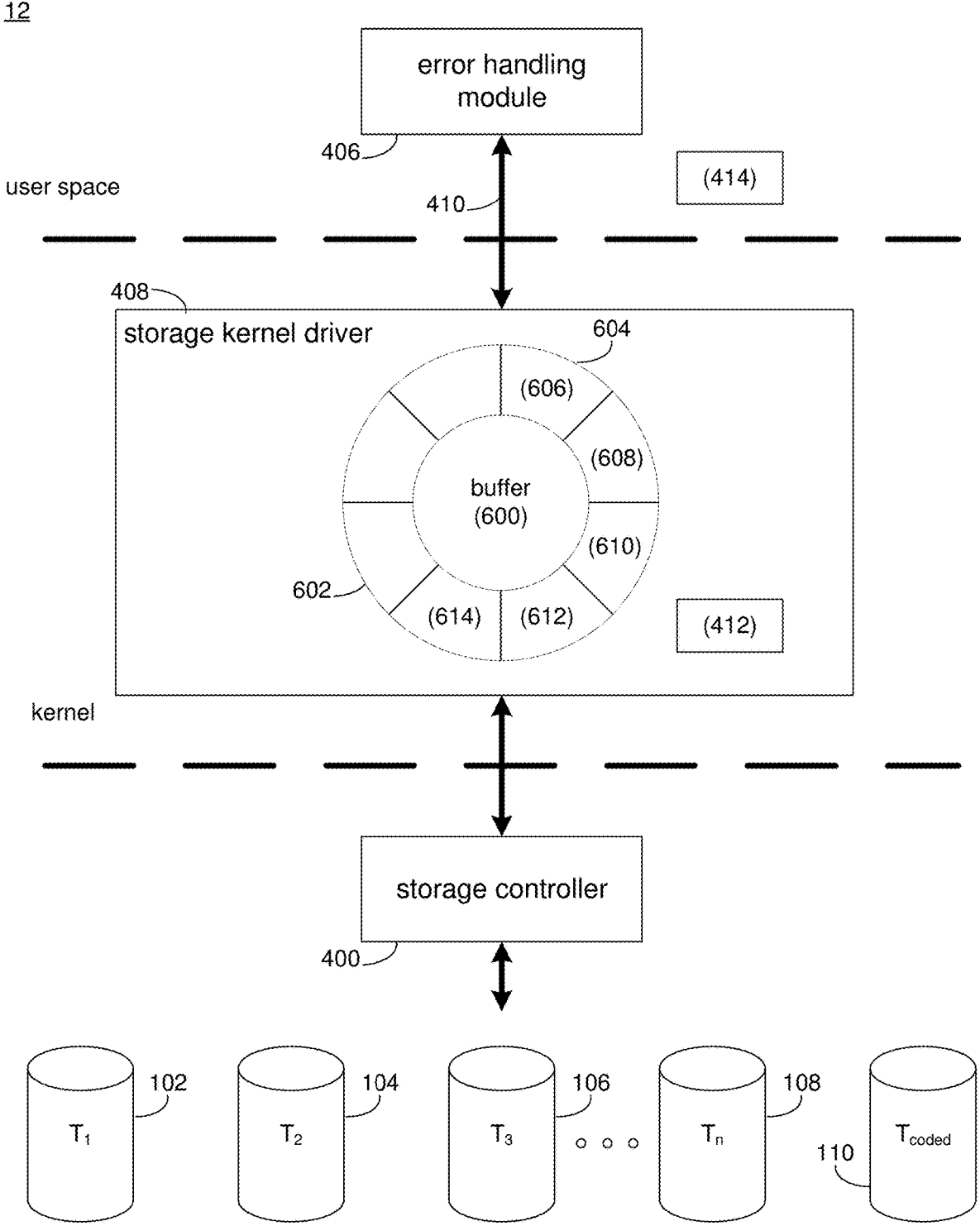
FIG. 6 is an example diagrammatic view of the storage system of FIG. 1 according to one or more example implementations of the disclosure.

In some implementations, sideband messaging process 10 may store 310, at the storage kernel driver, the one or more messages received from the one or more storage devices, in a buffer. Referring also to the example of FIG. 6 and in some implementations, sideband messaging process 10 may allocate one or more buffers (e.g., buffer 600) in storage kernel driver 408 in response to receiving the poll request sent 306 from error handling module 406. In some implementations, buffer 600 may include a ring buffer configured to write data around the ring such that the newest data is written to a "tail" (e.g., tail 602) of the ring buffer and the oldest data is read from the "head" (e.g., head 604) of the ring buffer. In some implementations, when writing new entries that will exceed the storage capacity of the ring buffer, the oldest entries may be overwritten by the newest entries. In the example of FIG. 6, suppose sideband messaging process 10 receives 308 e.g., five messages from one or more storage components (e.g., storage controller 400; storage targets 102, 104, 106, 108, 110; etc.). In this example, sideband messaging process 10 may store 310 these e.g., five error messages in buffer 600 as entries 606, 608, 610, 612, 614. While an example of a ring buffer has been used, it will be appreciated that any type of buffer may be used to store 310 the one or more messages within the scope of the present disclosure.

In some implementations and returning to the example flowchart of FIG. 5, in response to receiving 308 the one or more messages (e.g., action 502), sideband messaging process 10 may update tail 602 of buffer 600 (e.g., action 504). In some implementations, action 504 may also include determining whether the buffer has "wrapped" (i.e., where new entries being added to the ring buffer are overwriting oldest entries on the ring buffer). For example, sideband messaging process 10 may maintain a counter for each time a buffer has wrapped. In some implementations, this counter may be set by error handling module 406 and/or storage kernel driver 408. For example, when set by error handling module 406, the counter may indicate the current counter known by error handling module 406 (i.e., whether error handling module 406 "knows" it is behind in retrieving messages). In some implementations, storage kernel buffer 408 may determine if the counter is incorrect or outdated (e.g., based on the counter value set by error handling module 406). If the counter is incorrect or outdated, storage kernel driver 408 may modify or move head 604 to the oldest available data in buffer 600.

In some implementations and in response to receiving 308, at the storage kernel driver, the one or more messages from one or more storage devices of the storage system, sideband messaging process 10 may return 312 the poll request, via the sideband communication channel, to the error handling module. Referring again to the example flowchart of FIG. 5 and in some implementations, sideband messaging process 10 may, in response to receiving 308 the one or more messages, wake the poll request sent by error handling module 406 (e.g., action 506). As discussed above, the poll request sent 306 by error handling module 406 (e.g., action 500) may wait until certain conditions are met before returning. In this example, in response to receiving 308 the one or more messages, storage kernel driver 408 may wake the poll request. In some implementations, upon waking the poll request, sideband messaging process 10 may return 312 the poll request, via sideband communication channel 410, to error handling module 406 indicating that one or more messages are ready for communicating to and processing by error handling module 406 (e.g., action 508).

In some implementations, sideband messaging process 10 may communicate 304, via the sideband communication channel, at least one message of the one or more messages from the storage kernel driver to the error handling module. As discussed above, sideband messaging process 10 may communicate 304 messages from the storage kernel driver to the error handling module via a sideband communication channel in real-time without being dependent upon IO traffic and/or the IO channel. Referring again to the example of FIG. 4 and in some implementations, unlike conventional approaches that rely upon an IO channel (e.g., IO channel 404) and pre-allocated memory within each IO packet (e.g., portion 402 of IO 20), sideband messaging process 10 may communicate 304, via sideband communication channel 410, at least one message (e.g., message 412) from the storage kernel driver (e.g., storage kernel driver 408) in the kernel space of the software IO stack to the error handling module (e.g., error handling module 406) in the user space of the software IO stack without impacting IO operations and without potentially wasting CPU cycles to determine whether or not a response to an IO includes messages from other components of the storage system.

In some implementations, communicating 304, via the sideband communication channel, the at least one message of the one or more messages from the storage kernel driver to the error handling module may include sending 314, via the sideband communication channel, one or more input/output control requests from the error handling module to the storage kernel driver. Referring again to the example flowchart of FIG. 5 and in some implementations, sideband messaging process 10 may send 314, via sideband communication channel, one or more input/output control requests (e.g., input/output control request 414) from error handling module 406 to storage kernel driver 408 (e.g., action 510). As is known in the art, an input/output control request (IOCTL) may generally include a system call for device-specific input/output operations or other operations. In this example, sideband messaging process 10 may send 314, via sideband communication channel 410, one or more IOCTL requests (e.g., IOCTL request 414) to retrieve the at least one message (e.g., message 412) of the one or more messages from storage kernel driver 408. While examples have been provided for using an IOCTL request to retrieve messages from the storage kernel driver, it will be appreciated that other types of requests or communication protocols may be used to communicate, via the sideband communication channel, messages from the storage kernel driver to the error handling module.

In some implementations, sending 314, via the sideband communication channel, the one or more input/output control requests from the error handling module to the storage kernel driver may be in response to the storage kernel driver returning 308 the poll request. In this example, the return of the poll request (e.g., action 508) may indicate that one or more messages are available at the storage kernel driver for processing by the error handling module. In this manner, the error handling module may be prompted to retrieve messages from the storage kernel driver. In some implementations, sideband messaging process 10 may be configured to periodically (e.g., each second, each hour, each day, etc.) send 314 the one or more IOCTL requests to retrieve any messages from the storage kernel driver. However, it will be appreciated that sideband messaging process 10 may be configured to communicate messages from the storage kernel driver in response to determining that messages have been received by the storage kernel driver (e.g., in response to the poll request being returned) and/or periodically based on a predefined frequency (e.g., user-defined, automatically defined via sideband messaging process 10, etc.).

In some implementations, each input/output control request may be configured to retrieve a predefined number of messages from the storage kernel driver. For example, each IOCTL request may be configured to return a predefined amount of data from the storage kernel driver to the error handling module. In one example, each IOCTL request may be configured to retrieve e.g., over 200 messages from the storage kernel driver. However, it will be appreciated that the number of messages that may be retrieved with a single IOCTL request may be based upon, at least in part, the size of the message(s) and/or the capacity of the of the IOCTL request.

Referring again to the example flowchart of FIG. 5 and in some implementations, in response to receiving the one or more IOCTL requests from the error handling module, sideband messaging process 10 may determine the next message in the buffer to communicate 304 from the storage kernel driver to the error handling module via the IOCTL request (e.g., action 512). In some implementations and as discussed above, the next message in the buffer to communicate 304 from the storage kernel driver to the error handling module may be the head of the buffer (e.g., the oldest entry of the buffer).

In some implementations, sideband messaging process 10 may remove the next message from the buffer for communicating to the error handling module via the IOCTL request and may determine whether there are additional messages in the buffer to communicate 304 to the error handling module in the IOCTL request (e.g., action 514). For example, sideband messaging process 10 may determine whether additional messages can be communicated to the error handling module via the IOCTL request (i.e., whether the IOCTL request is able to return any more messages from the buffer) and/or whether there are any additional messages in the buffer to communicate to the error handling module. In response to determining that no other messages are available for communicating to the error handling module in the IOCTL request, sideband messaging process 10 may return the IOCTL request with the message(s) from the storage kernel driver to the error handling module via the sideband communication channel (e.g., action 516).

In some implementations, sideband messaging process 10 may, in response to determining that additional messages are waiting in the buffer of the storage kernel driver, send 314 one or more additional IOCTL requests (e.g., repeat from action 510) until there are no more messages to communicate 304 to the error handling module. In some implementations, sideband messaging process 10 may send 306 a new poll request when all messages of the buffer have been communicated to the error handling module (e.g., action 518).

Referring again to the example of FIG. 6 and in some implementations, suppose sideband messaging process 10 sends 314, via sideband communication channel 410, IOCTL request 414 from error handling module 406 and that each IOCTL request is configured to retrieve e.g., five messages from storage kernel driver 408. In the example of FIG. 6, sideband messaging process 10 may determine that the next message in the buffer (e.g., buffer 600) to communicate 304 is head entry 604. In this example, sideband messaging process 10 may be configured to communicate 304, via sideband communication channel 410, e.g., five messages (e.g., messages 606, 608, 610, 612, 614) from buffer 600 of storage kernel driver 408 to error handling module 406 for processing by error handling module 406.

As discussed above and in some implementations, by communicating 304 the at least one message from the storage kernel driver to the error handling module via the sideband communication channel, the error handling module may be able to more quickly respond to messages generated by storage devices and/or other components on the backend of the storage system. Additionally, the at least one message may be communicated more quickly via the sideband communication channel than via the IO channel, without pre-allocating any memory in each IO packet or requiring processing of each IO to check for messages within the IO. In one example implementation of the present disclosure, sideband messaging process 10 may be able to communicate a plurality of messages (e.g., over 200 messages) from the storage kernel driver to the error handling module in less than ten microseconds.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
generating a sideband communication channel between a storage kernel driver and an error handling module of a storage system;
detecting one or more messages on the storage kernel driver; and
communicating, via the sideband communication channel, at least one message of the one or more messages from the storage kernel driver to the error handling module, wherein communicating, via the sideband communication channel, the at least one message of the one or more messages from the storage kernel driver to the error handling module includes sending, via the sideband communication channel, one or more input/output control requests from the error handling module to the storage kernel driver, wherein each input/output control request is configured to retrieve a predefined number of messages from the storage kernel driver.

2. The computer-implemented method of claim 1, wherein generating the sideband communication channel between the storage kernel driver and the error handling module of the storage system includes sending, via the sideband communication channel, a poll request from the error handling module to the storage kernel driver.

3. The computer-implemented method of claim 2, wherein detecting the one or more messages of the storage kernel driver includes receiving, at the storage kernel driver, the one or more messages from one or more storage devices of the storage system.

4. The computer-implemented method of claim 3, further comprising:
in response to receiving, at the storage kernel driver, the one or more messages from one or more storage devices of the storage system, returning the poll request, via the sideband communication channel, to the error handling module.

5. The computer-implemented method of claim 3, further comprising:
storing, at the storage kernel driver, the one or more messages received from the one or more storage devices, in a buffer.

6. A computer program product residing on a non-transitory computer readable medium having a plurality of instructions stored thereon which, when executed by a processor, cause the processor to perform operations comprising:
generating a sideband communication channel between a storage kernel driver and an error handling module of a storage system;
detecting one or more messages on the storage kernel driver; and
communicating, via the sideband communication channel, at least one message of the one or more messages from the storage kernel driver to the error handling module, wherein communicating, via the sideband communication channel, the at least one message of the one or more messages from the storage kernel driver to the error handling module includes sending, via the sideband communication channel, one or more input/output control requests from the error handling module to the storage kernel driver, wherein each input/output control request is configured to retrieve a predefined number of messages from the storage kernel driver.

7. The computer program product of claim 6, wherein generating the sideband communication channel between the storage kernel driver and the error handling module of the storage system includes sending, via the sideband communication channel, a poll request from the error handling module to the storage kernel driver.

8. The computer program product of claim 7, wherein detecting the one or more messages of the storage kernel driver includes receiving, at the storage kernel driver, the one or more messages from one or more storage devices of the storage system.

9. The computer program product of claim 8, wherein the operations further comprise:
in response to receiving, at the storage kernel driver, the one or more messages from one or more storage devices of the storage system, returning the poll request, via the sideband communication channel, to the error handling module.

10. The computer program product of claim 8, wherein the operations further comprise:
storing, at the storage kernel driver, the one or more messages received from the one or more storage devices, in a buffer.

11. A computing system comprising:
a memory; and
a processor configured to generate a sideband communication channel between a storage kernel driver and an error handling module of a storage system, wherein the processor is further configured to detect one or more messages on the storage kernel driver, and wherein the processor is further configured to communicate, via the sideband communication channel, at least one message of the one or more messages from the storage kernel driver to the error handling module, wherein communicating, via the sideband communication channel, the at least one message of the one or more messages from the storage kernel driver to the error handling module includes sending, via the sideband communication channel, one or more input/output control requests from the error handling module to the storage kernel driver, wherein each input/output control request is configured to retrieve a predefined number of messages from the storage kernel driver.

12. The computing system of claim 11, wherein generating the sideband communication channel between the storage kernel driver and the error handling module of the storage system includes sending, via the sideband communication channel, a poll request from the error handling module to the storage kernel driver.

13. The computing system of claim 12, wherein detecting the one or more messages of the storage kernel driver includes receiving, at the storage kernel driver, the one or more messages from one or more storage devices of the storage system.

14. The computing system of claim 13, wherein the processor is further configured to:
in response to receiving, at the storage kernel driver, the one or more messages from one or more storage devices of the storage system, return the poll request, via the sideband communication channel, to the error handling module.

15. The computing system of claim 13, wherein the processor is further configured to:
store, at the storage kernel driver, the one or more messages received from the one or more storage devices, in a buffer.

* * * * *